United States Patent [19]
Bae

[11] Patent Number: 6,144,703
[45] Date of Patent: Nov. 7, 2000

[54] CIRCUIT FOR SYNTHESIZING MULTIPLE PULSE CODE MODULATION DATA

[75] Inventor: Il-Hwan Bae, Kyongsangbuk-do, Rep. of Korea

[73] Assignee: SamSung Electronics Co., Ltd., Suwon, Rep. of Korea

[21] Appl. No.: 09/039,323

[22] Filed: Mar. 16, 1998

[30] Foreign Application Priority Data

Mar. 14, 1997 [KR] Rep. of Korea .......................... 97-8626

[51] Int. Cl.[7] .................................................. H04B 14/04
[52] U.S. Cl. ............................................ 375/242; 341/143
[58] Field of Search ..................................... 375/242, 243, 375/244, 253, 254, 316; 332/106, 112; 341/143

[56] References Cited

U.S. PATENT DOCUMENTS

| | | | |
|---|---|---|---|
| 3,988,528 | 10/1976 | Yanagimachi et al. | 375/242 |
| 4,298,979 | 11/1981 | Dobyns et al. | 375/242 |
| 4,312,063 | 1/1982 | Warner | 375/242 |
| 4,319,352 | 3/1982 | Gupta et al. | 375/242 |
| 5,822,686 | 10/1998 | Lundberg et al. | 375/242 |

*Primary Examiner*—Chi H. Pham
*Assistant Examiner*—Jean B Corrielus
*Attorney, Agent, or Firm*—Robert E. Bushnell, Esq.

[57] ABSTRACT

A circuit for synthesizing multiple pulse code modulation (PCM) data in a full electronic switching system includes an upper processor for generating commands to request the pulse code modulation channel allocation and transmission of the pulse code modulated data. A plurality of lower processors generate the pulse code modulated data through their respective channels allocated according to the command of the upper processor. A data combining circuit combines the pulse code modulated data of the lower processors into the pulse code modulation channel data corresponding to the respective channels. A connection circuit transmits the pulse code modulation channel data.

20 Claims, 3 Drawing Sheets

CIRCUIT FOR SYNTHESIZING MULTIPLE PULSE CODE MODULATION DATA

CLAIM OF PRIORITY

This application makes reference to, incorporates the same herein, and claims all benefits accruing under 35 U.S.C §119 from an application entitled Circuit For Synthesizing Multiple Pulse Code Modulation Data earlier filed in the Korean Industrial Property Office on Mar. 14, 1997, and there duly assigned Ser. No. 97-8626 by that Office.

BACKGROUND OF THE INVENTION

1. Field of the Invention

The present invention concerns a circuit for synthesizing multiple pulse code modulation (PCM) data in a communication system and a method therefore.

2. Description of the Related Art

A modern communication system typically comprises a switching system and radio pager system to provide communication services including the voice communication by means of a computer with a modem. Such a conventional communication system includes a full electronic switching system and has no means to synthesize the PCM data according to the channels.

SUMMARY OF THE INVENTION

It is an object of the present invention to provide an improved circuit for synthesizing pulse code modulated data.

It is another object to provide a circuit for synthesizing multiple PCM data according to the channels to produce a frame output.

According to the present invention, a circuit for synthesizing multiple pulse code modulation (PCM) data in a full electronic switching system comprises an upper processor for generating commands to request PCM channel allocation and transmission of PCM data, a plurality of lower processors for generating the PCM data through their respective channels and allocated according to the command of the upper processor, a data combining circuit for combining the PCM data of the lower processors into the PCM channel data corresponding to the respective channels, and a connection circuit for transmitting the PCM channel data.

The present invention will now be described more specifically with reference to the drawings attached only by way of example, where same reference numerals indicate same functional elements. In addition, descriptions are omitted concerning the conventional elements which are not needed for grasping the inventive concept.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
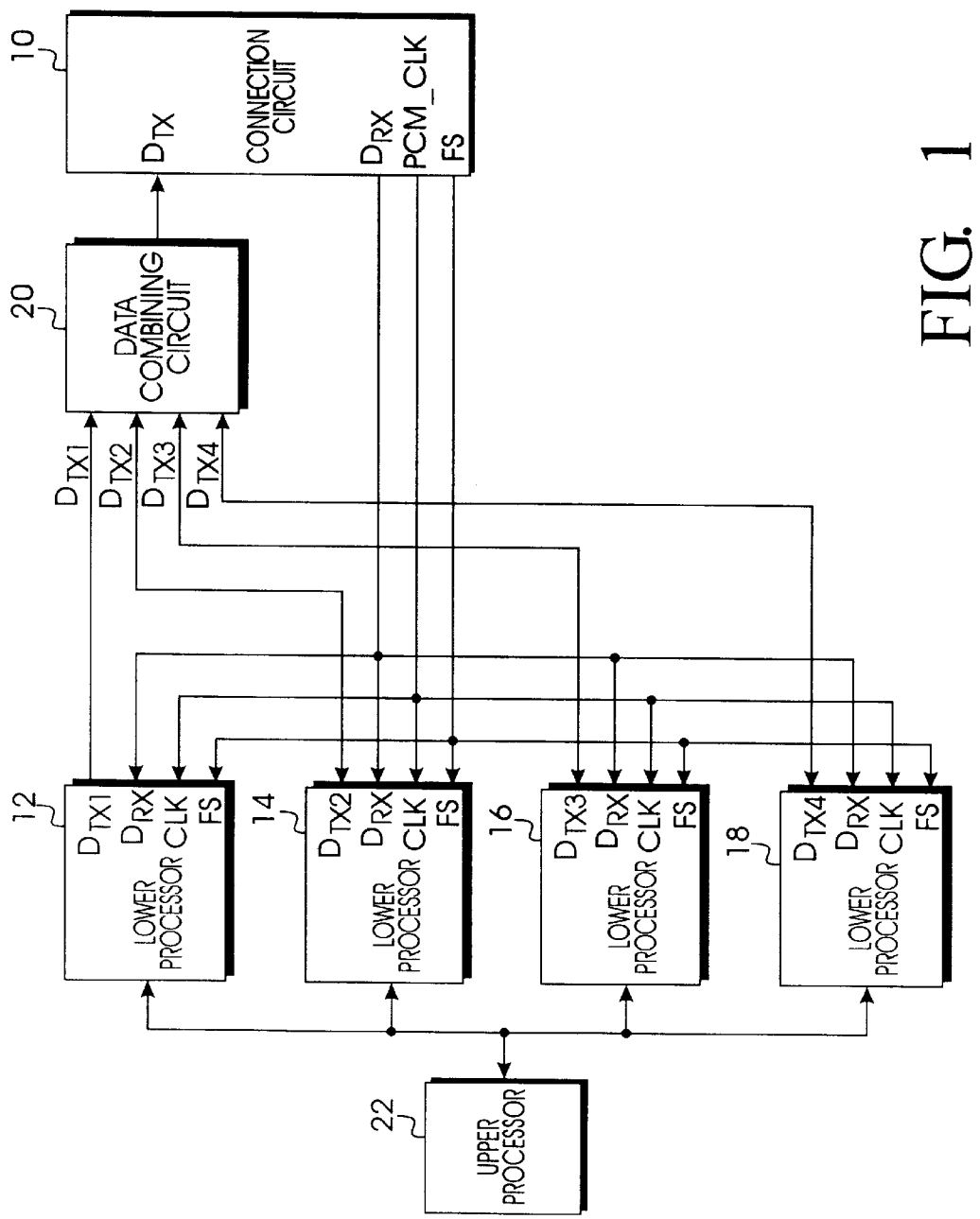
FIG. 1 is a block diagram for illustrating a circuit for synthesizing the multiple PCM data according to the principles of the present invention.

Turning now to the drawings and referring to FIG. 1, a connection circuit 10, such as a time switch connection circuit or digital connection circuit, delivers a frame synchronizing signal FS, PCM clock pulses PCM_CLK and received PCM data $D_{RX}$ to a plurality of lower processors 12, 14, 16, 18, and processes multiple PCM data $D_{TX}$ combined by a data combining circuit 20. Lower processors 12, 14, 16 and 18 each process corresponding PCM data in response to FS and PCM_CLK and transfer the resultant data to an upper processor 22. As will be described below in more detail, lower processors 12, 14, 16 and 18 generate register signals R, dual tone multiple frequency (DTMF) signals, modem data signals and voice encoded signals to convert them into transmitted PCM data $D_{TX1}$, $D_{TX2}$, $D_{TX3}$, $D_{TX4}$ in response to a command from upper processor 22. It may be noted that the register signals R, such as R1 and R2, designate the telecommunication protocols between one signaling system and the other signaling system. Specifically, and in accordance with the International Telegraph and Telephone Consultative Committee (i.e., the CCITT), the register signals designated as R1 multi-frequency code (MFC) signaling and R2 multi-frequency code signaling.

The transmitted PCM data $D_{TX1}$, $D_{TX2}$, $D_{TX3}$, $D_{TX4}$ have a frame unit consisting of 32 channels, combined and transferred through data combining circuit 20 to connection circuit 10. The number of lower processors utilized may be determined according to the amount of actually processed digital signals, e.g., as 8, 10, 12, . . . , N. Lower processors 12, 14, 16, 18 may be programmed to perform particular PCM processing functions or may operate in response to one or more programs downloadable from an external memory (not shown).

Figure 2:
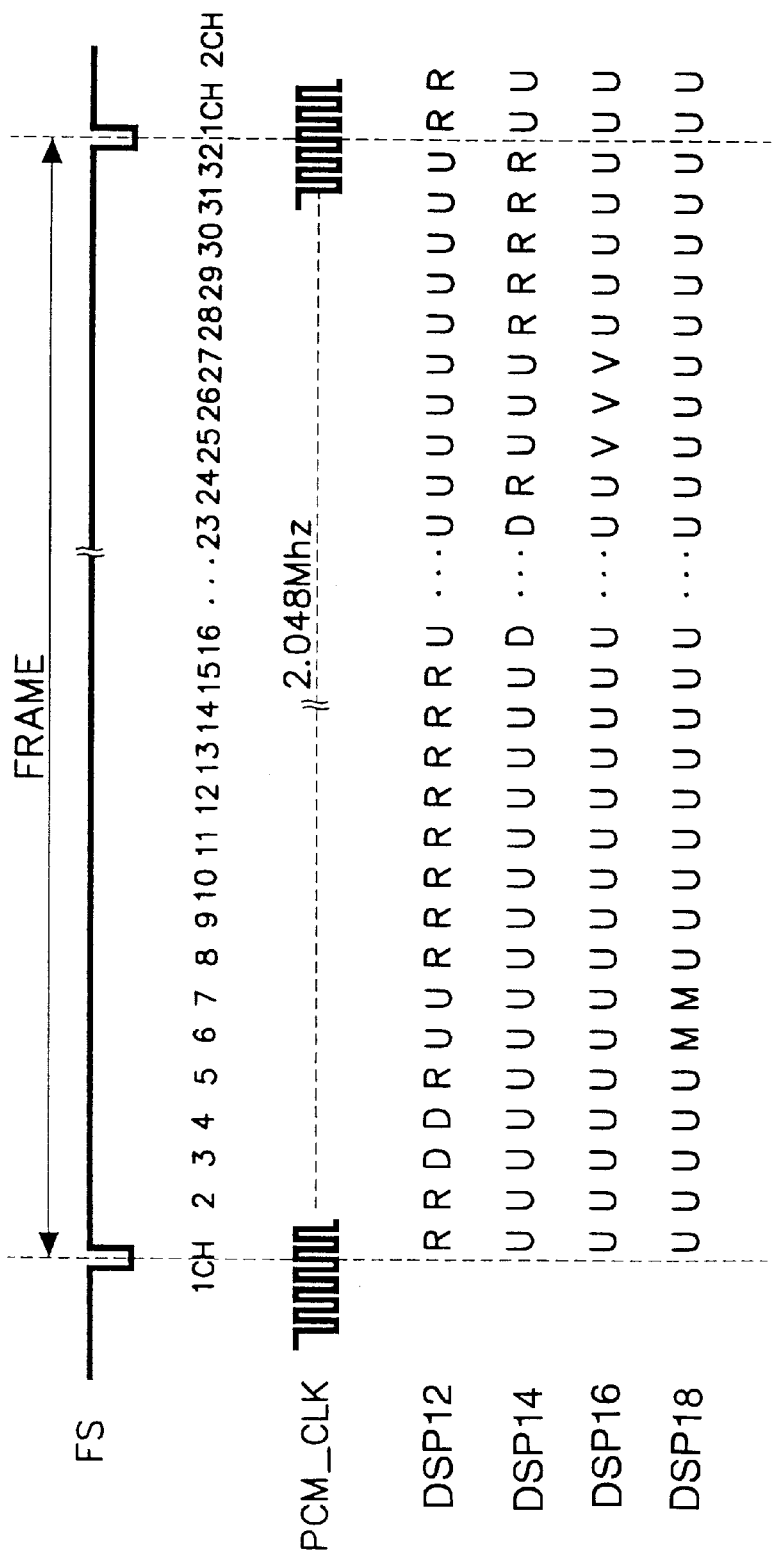
FIG. 2 is a timing diagram for illustrating the operation of the inventive circuit.

The timing diagram of FIG. 2 illustrates the PCM data output from the lower processors to data combining circuit 20, where FS represents the signal for synchronizing both the beginning and the end of the frame consisting of 32 channels, and PCM_CLK may use 32×8 clock pulses in order to synchronize the 32 channels. Namely, a single channel consists of 8 bits determined by 8 PCM_CLK pulses, which have a frequency of 2.048 MHz. Among these lower processors, processors 12 and 14 serve to detect and transfer the register signals R, the DTMF signals, and other tone signals. Processor 16 serves to encode and decode the sound or voice signal. Processor 18 serves to encode and decode the signal for modem data communication.

Figure 3:
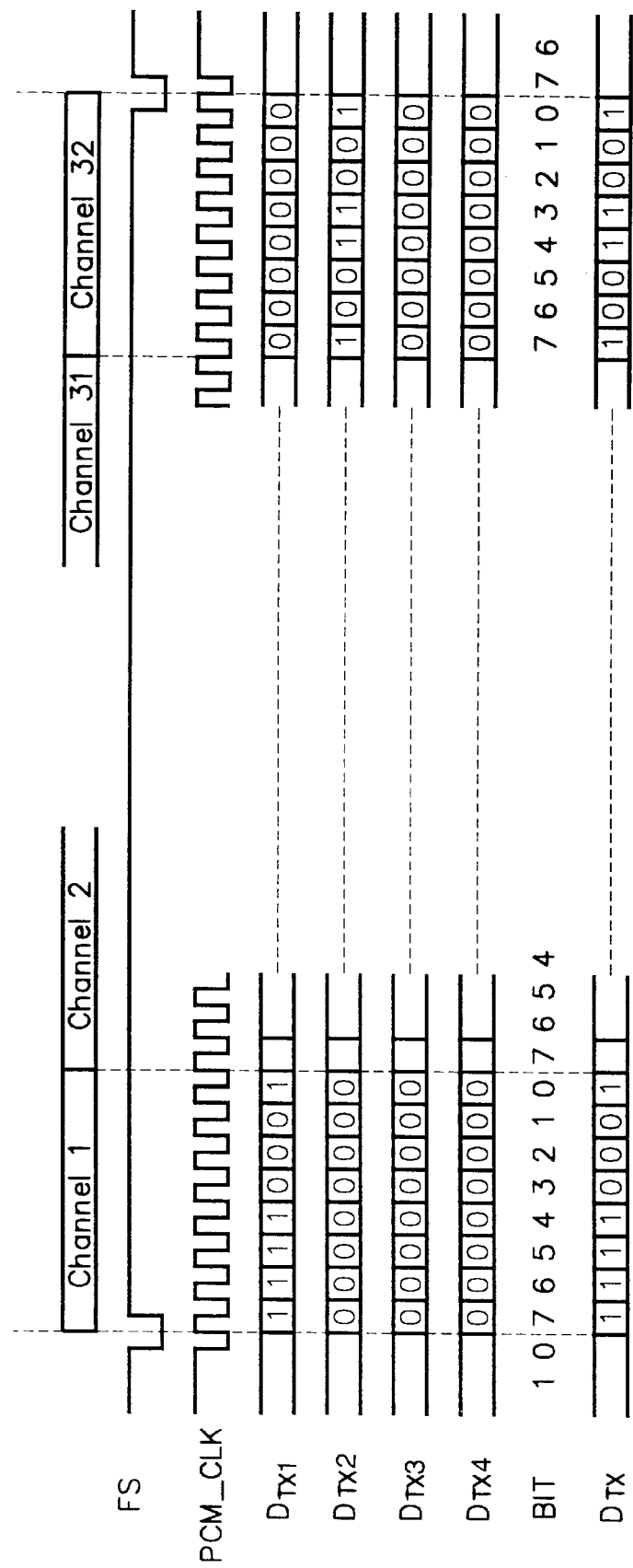
FIG. 3 is a timing diagram for illustrating the data of FIG. 2 combined according to the principles of the present invention.

FIG. 3 is a timing diagram for illustrating the actual PCM data delivered from lower processors 12, 14, 16, 18 according to their respective functions and the PCM channel data generated from data combining circuit 20. Describing the operation of the present circuit in reference to FIGS. 1 and 2, lower processors 12, 14, 16, 18 are synchronized with the PCM_CLK pulses of the 32 channels constituting a single frame to process (decode) the received PCM data $D_{RX}$ corresponding to each of the channels, and to transfer the results of the processing (decoded data) to upper processor 22, when connection circuit 10 provides FS indicating the beginning of the frame.

Thereafter, lower processor 12 receives and transmits data on all 32 channels, however, only PCM data with respect to channels 1–5 and 8–15 is actually processed. Accordingly, lower processor 12 detects received PCM data $D_{RX}$ as the register signals R to be transferred to upper processor 22 when receiving the PCM data of channels 1–5 and 8–15. The PCM data $D_{TX1}$ of the channels 1, 2, 5 and 8–15 transmitted by processor 12 is the PCM data processed as the register signals R. Reference "R" represents the register signal. Meanwhile, the transmitted PCM data $D_{TX1}$ of channels 3 and 4 are the PCM data (represented as "D" in FIG. 2) according to the transmission of DTMF. The reference "D" represents DTMF signals. Lower processor 12 assigns a specific value "U" to channels 6, 7 and 16–32, wherein U does not effect the PCM data on these channels output by any of the other processors. Channels 8 through 15 may be processed in the same manner as the first, second and fifth channels.

Lower processor 14 receives and transmits data on all 32 channels, however, only PCM data with respect to channels 16 through 24 and 28 through 32 is actually processed. Accordingly, lower processor 14 detects DTMF signals (represented as "D" in FIG. 2) on channels 16 through 23 and detects the register signals R (represented as "R" in FIG. 2) on channels 24 and 28 through 32 as the received PCM data $D_{RX}$. Lower processor 14 transmits DTMF signals through channels 16 through 23 and transmits the register signals R on channels 24 and 28–32 as the transmitted PCM data $D_{TX2}$. Lower processor 14 assigns a specific value "U" to channels 1–15 and 25–27, wherein U does not effect the PCM data on these channels output by any of the other processors. The reference U indicates an unused PCM channel.

Lower processor 16 receives and transmits data on all 32 channels, however, only PCM data with respect to channels 25–27 is actually processed. Accordingly, lower processor 16 encodes and decodes the PCM data of channels 25–27 as the transmitted PCM data $D_{TX3}$ (represented as "V" in FIG. 2). The reference "V" indicates voice (or sound) signal. Lower processor 16 assigns a specific value "U" to channels 1–24 and 28–32, wherein U does not effect the PCM data on these channels output by any of the other processors.

Lower processor 18 receives and transmits data on all 32 channels, however, only PCM data with respect to channels 6 and 7 is actually processed. Accordingly, lower processor 18 processes the received PCM data $D_{RX}$ of channels 6 and 7. The transmitted PCM data $D_{TX4}$ (represented as "M" in FIG. 2) of channels 6 and 7 is delivered through the output $D_{TX4}$ of lower processor 18 according to data communication through a modem. The reference "M" indicates a modem data signal. Lower processor 18 assigns a specific value "U" to channels 6 and 7, wherein U does not effect the PCM data on these channels output by any of the other processors.

As described above, while each of the lower processors receives PCM data $D_{RX}$ of the 32 channels to be delivered to upper processor 22, and generates the transmitted PCM data $D_{TX}$ in response to a command from upper processor 22. The specific value U does not affect the transmitted real PCM data. For example, processor 12 transmits PCM data $D_{TX1}$ on channels 1–5 and 8–15 while the other processors 14, 16, 18 respectively transmit PCM data $D_{TX2}$, $D_{TX3}$, $D_{TX4}$ of a specific value U through the same channels 1–5 and 8–15. The PCM channel allocation is randomly made according to a command of upper processor 22, and a loading program of lower processors 12, 14, 16, 18 may be obtained in many varieties according to a desired application.

The transmitted PCM data $D_{TX1}$, $D_{TX2}$, $D_{TX3}$, $D_{TX4}$ from lower processors 12, 14, 16, 18 are combined by data combining circuit 20 to provide a frame of 32 channels of PCM data to connection circuit 10. Namely, data combining circuit 20 may be comprised of an OR gate arrangement to logically add the four transmitted PCM data $D_{TX1}$, $D_{TX2}$, $D_{TX3}$, $D_{TX4}$. The PCM data U, R, D, V, M generated from processors 12, 14, 16, 18 respectively may use 8 bits. FIG. 2 illustrates an example of the structure of the PCM data delivered from lower processors 12, 14, 16, 18 to data combining circuit 20 according to the PCM channel timing while FIG. 3 illustrates the PCM data of FIG. 2 combined by data combining circuit 20 as the transmitted PCM channel data. Thus, the PCM data delivered from connection circuit 10 are correctly and functionally processed through a plurality of the processors.

What is claimed is:

1. A circuit for synthesizing multiple pulse code modulated data in a full electronic switching system, comprising:

an upper processor for generating commands for pulse code modulation channel allocation and for transmission of pulse code modulated data;

a plurality of lower processors, each of said lower processors being allocated, in response to said command for pulse code modulation channel allocation, different ones of thirty-two pulse code modulation channels during a frame period for processing pulse code modulated data;

said lower processors generating processed pulse code modulated data through their respective allocated channels in response to said command for transmission of pulse code modulated data, each of said lower processors also providing decoded pulse code modulated data to said upper processor;

a data combining circuit for combining the pulse code modulated data corresponding to said allocated channels of said lower processors into a thirty-two channel frame of pulse code modulated data; and a connection circuit for transmitting said thirty-two channel frame of pulse code modulated data.

2. The circuit as set forth in claim 1, further comprising each of said lower processors outputting thirty-two channels of pulse code modulated data, wherein said pulse code modulated data on ones of said thirty-two channels not allocated for processing pulse code modulated data comprises a specific value not affecting said processed pulse code modulated data generated by the others of said lower processors.

3. The circuit as set forth in claim 1, said data combining circuit comprising:

logic gate means for logically adding all the channel data of said lower processors into said thirty-two channel frame of pulse code modulated data for transfer to said connection circuit.

4. The circuit as set forth in claim 2, said data combining circuit comprising:

logic gate means for logically adding all the channel data of said lower processors into said thirty-two channel frame of pulse code modulated data for transfer to said connection circuit.

5. The circuit as set forth in claim 3, further comprising each of said lower processors outputting thirty-two channels of pulse code modulated data, wherein said pulse code modulated data on ones of said thirty-two channels not allocated for processing pulse code modulated data comprises a specific value not affecting said processed pulse code modulated data generated by the others of said lower processors.

6. The circuit as set forth in claim 1, wherein said connection circuit generates frame synchronization signals and pulse code modulation clock signals, said frame synchronizing signals synchronizing said lower processors to both the beginning and the end of said frame period, and said pulse code modulation clock signals synchronize said lower processors to said thirty-two channels.

7. The circuit as set forth in claim 6, wherein each of said thirty-two channels carries 8 bits of pulse code modulated data and said pulse code modulation clock signals consists essentially of 8 clock pulses per channel.

8. A circuit for synthesizing multiple pulse code modulation (PCM) data in a full electronic switching system, comprising:
- a connection circuit for receiving and transmitting a frame of pulse code modulated data, said frame comprising a plurality of pulse code modulation channels;
- an upper processor for generating commands for pulse code modulation channel allocation and for transmission of pulse code modulated data;
- a plurality of lower processors, each of said lower processors being allocated, in response to said command for pulse code modulation channel allocation, different ones of said plurality of pulse code modulation channels;
- each of said lower processors encoding pulse code modulated data for transmission through their respective allocated channels in response to said command for transmission of pulse code modulated data;
- each of said lower processors providing decoded pulse code modulated data to said upper processor; and
- a data combining circuit for combining encoded pulse code modulated data corresponding to said allocated channels of said lower processors into a frame of pulse code modulated data for output to said connection circuit.

9. The circuit as set forth in claim 8, wherein said frame comprises thirty-two pulse code modulation channels.

10. The circuit as set forth in claim 8, wherein said connection circuit generates frame synchronization signals and pulse code modulation clock signals, said frame synchronizing signals synchronizing said lower processors to both a beginning and an end of a frame period, and said pulse code modulation clock signals synchronize said lower processors to said plurality of channels.

11. The circuit as set forth in claim 9, wherein said connection circuit generates frame synchronization signals and pulse code modulation clock signals, said frame synchronizing signals synchronizing said lower processors to both a beginning and an end of a frame period, and said pulse code modulation clock signals synchronize said lower processors to said thirty-two channels.

12. The circuit as set forth in claim 10, wherein each of said channels carries 8 bits of pulse code modulated data and said pulse code modulation clock signals consists of 8 clock pulses per channel.

13. The circuit as set forth in claim 11, wherein each of said thirty-two channels carries 8 bits of pulse code modulated data and said pulse code modulation clock signals consists of 8 clock pulses per channel.

14. The circuit as set forth in claim 9, further comprising each of said lower processors outputting thirty-two channels of encoded pulse code modulated data, wherein said encoded pulse code modulated data on ones of said thirty-two channels not allocated for processing pulse code modulated data comprises a specific value not affecting said encoded pulse code modulated data generated by the others of said lower processors when said encoded pulse code modulated data is combined in said data combining circuit.

15. The circuit as set forth in claim 8, wherein said plurality of lower processors comprises:
- a first lower processor for decoding and encoding pulse code modulated data corresponding to register signals and dual tone modulation frequency signals on first ones of said allocated channels;
- a second lower processor for decoding and encoding pulse code modulated data corresponding to register signals and dual tone modulation frequency signals on second ones of said allocated channels;
- a third lower processor for decoding and encoding pulse code modulated data corresponding to sound signals on third ones of said allocated channels; and
- a fourth lower processor for decoding and encoding pulse code modulated data corresponding to modem signals on fourth ones of said allocated channels.

16. The circuit as set forth in claim 15, wherein said frame comprises thirty-two pulse code modulation channels.

17. The circuit as set forth in claim 16, wherein said first ones of said allocated channels comprises channels 1–5 and 8–15, said second ones of said allocated channels comprises channels 16–26 and 28–32, said third ones of said allocated channels comprises channels 25–27, and said fourth ones of said allocated channels comprises channels 6 and 7.

18. A circuit for synthesizing multiple pulse code modulated data in a full electronic switching system, comprising:
- an upper processor for generating commands for pulse code modulation channel allocation and for transmission of pulse code modulated data;
- a plurality of lower processors, each of said lower processors being allocated, in response to said command for pulse code modulation channel allocation, different ones of thirty-two pulse code modulation channels during a frame period for processing pulse code modulated data;
- said lower processors generating processed pulse code modulated data through their respective allocated channels in response to said command for transmission of pulse code modulated data;
- a data combining circuit for combining the pulse code modulated data corresponding to said allocated channels of said lower processors into a thirty-two channel frame of pulse code modulated data; and
- a connection circuit for transmitting said thirty-two channel frame of pulse code modulated data, wherein said connection circuit generates frame synchronization signals and pulse code modulation clock signals, said frame synchronizing signals synchronizing said lower processors to both the beginning and the end of said frame period, and said pulse code modulation clock signals synchronize said lower processors to said thirty-two channels.

19. The circuit as set forth in claim 18, wherein each of said thirty-two channels carries 8 bits of pulse code modulated data and said pulse code modulation clock signals consists essentially of 8 clock pulses per channel.

20. The circuit as set forth in claim 18, wherein each of said lower processors providing decoded pulse code modulated data to said upper processor.

* * * * *